United States Patent [19]

Patterson

[11] Patent Number: 4,909,459
[45] Date of Patent: Mar. 20, 1990

[54] HELMET-MOUNTED HEAD RESTRAINT

[75] Inventor: Michael H. Patterson, Brunswick, Me.

[73] Assignee: The United States of America as represented by the Secretary of the Navy, Washington, D.C.

[21] Appl. No.: 266,955

[22] Filed: Nov. 3, 1988

[51] Int. Cl.$^4$ .............................................. B64D 25/04
[52] U.S. Cl. .................................. 244/122 AG; 2/410; 2/411; 2/6
[58] Field of Search ....... 244/122 R, 122 A, 122 AG; 2/410, 411, 6; 280/801, 806; 297/464, 468

[56] References Cited

U.S. PATENT DOCUMENTS

| | | | |
|---|---|---|---|
| 3,074,669 | 1/1963 | Bohlin | 244/122 AG |
| 4,477,041 | 10/1984 | Dunne | 244/122 AG |
| 4,638,510 | 1/1987 | Hubbard | 244/122 AG |
| 4,664,341 | 5/1987 | Cummings | 244/122 AG |
| 4,784,352 | 11/1988 | Smith et al. | 244/122 AG |

FOREIGN PATENT DOCUMENTS

| | | | |
|---|---|---|---|
| 8801968 | 3/1988 | PCT Int'l Appl. | 244/122 AG |
| 978422 | 12/1964 | United Kingdom | 244/122 AG |

Primary Examiner—Joseph F. Peters, Jr.
Assistant Examiner—Anne Sartelle
Attorney, Agent, or Firm—Susan E. Verona; James B. Bechtel; James V. Tura

[57] ABSTRACT

A head restraint for the occupant of a vehicle seat is disclosed, which restrains the forward and downward movement of the occupant's head when subjected to large deceleration forces. The restraint includes a strap assembly which encircles the back of the occupant's head and releasably connects to his helmet adjacent to each of his ears at two locations. A retaining strap is slidably connected by a loop to the strap assembly and extends behind the head to a restracting means fixed in the seat. The retracting means pulls the head back against the seat when the deceleration forces exceed a predetermined level, as during flight maneuvers. During normal flight conditions, the occupant is able to move his head freely from side to side as the strap assembly slides through the loop.

3 Claims, 1 Drawing Sheet

HELMET-MOUNTED HEAD RESTRAINT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to restraining apparatus for a vehicle occupants, such as an aircrewman in an aircraft, and more particularly to apparatus for restraining the forward and downward movement of the occupant's head when subjected to deceleration forces.

During the flight of high performance aircraft an aircrewman is often subjected to high acceleration or G-loads, especially during high speed maneuvers, that may displace him sufficiently out of position to interfere with his ability to control the aircraft. Restraining apparatus is therefore necessary to ensure the aircrewman's functionability and effectiveness. Currently, restraining systems exist which address this problem by holding the aircrewman's torso back against the seat when he is subjected to such high G-loads. With the advent of even higher performance, more maneuverable aircraft, a ned has developed for a means for restraining the head as well. Without it, the aircrewman's head may be forced forward and downward against his chest under a high deceleration load, preventing him from being able to see out the aircraft or even operate his controls. However, an effective head restraining means should not interfere with the aircrewman's ability to move his head under normal flight conditions.

Currently, head restraints do exist, but most are designed for use in preparation for ejection from the aircraft. Others are designed to protect against lateral, as opposed to logitudinal, forces, or incorporate several cables from the helmet to the aircraft seat.

SUMMARY OF THE INVENTION

Accordingly, it is a general purpose and object of the present invention to provide a head restraint for the occupant of a high performance vehicle such as an aircraft.

A more particular object of the present invention is to provide a head restraint for an aircrewman which does not interfere with his control of the aircraft.

Another object is to restrain an aircrewman's head from moving forward and downward when the force of deceleration on the head exceeds a predetermined level, as during periods of high deceleration loading, and to allow freedom of movement of the pilot's head from side-to-side during all other flight conditions.

Yet another object is to provide an aircrewman head restraint which is simple and economical to fabricate and use.

Briefly, these and other objects are accomplished by a strap assembly which encircles the back of a vehicle seat occupant's ead and releasably connects to his helmet adjacent to each of his ears at two locations. A retaining strap has a loop at one end thereof through which the strap assembly slides. A restracting means is rigidly fixed to the vehicle seat behind the occupant's head and is releasably attached to the other end of the retaining strap for pulling the head back only when deceleration forces to which the head is subjected are above a predetermined level.

Other objects, advantages and novel features of the invention will become apparent from the following detailed description when considered in conjunction with the accompanying drawings, wherein:

DESCRIPTION OF THE PREFERRED EMBODIMENT

Figure 1:
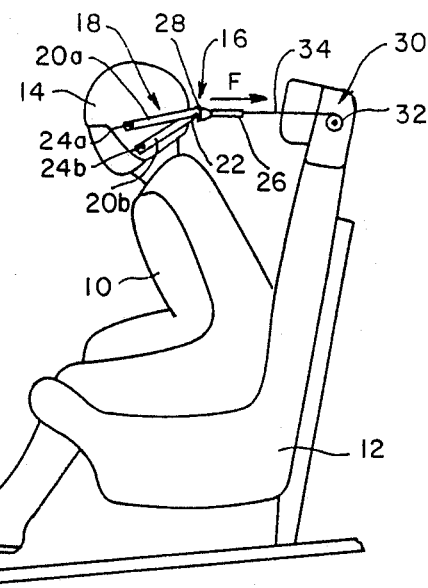
FIG. 1 is a side view of a head restraint according to the present invention being used by an occupant of a vehicle seat.
Figure 2:
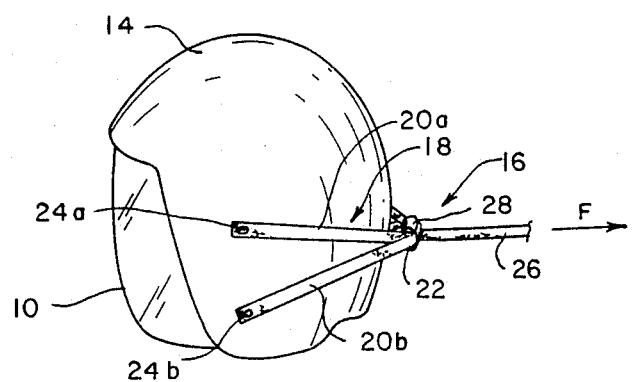
FIG. 2 is an enlarged view of the head restraint of FIG. 1.

Referring now to the drawings wherein like characters represent like or corresponding parts throughout the several views, there is shown in FIG. 1 an aircrewman 10, seated in an aircraft seat 12 and wearing a helmet 14 and a head restraint 16 according to the present invention. As best illustrated in FIG. 2, head restraint 16 comprises a strap assembly 18, which loosely encircles the back half of the head and is releasably connected to each side of helmet 14 at two points adjacent to the ears of aircrewman 10.

Figure 3:
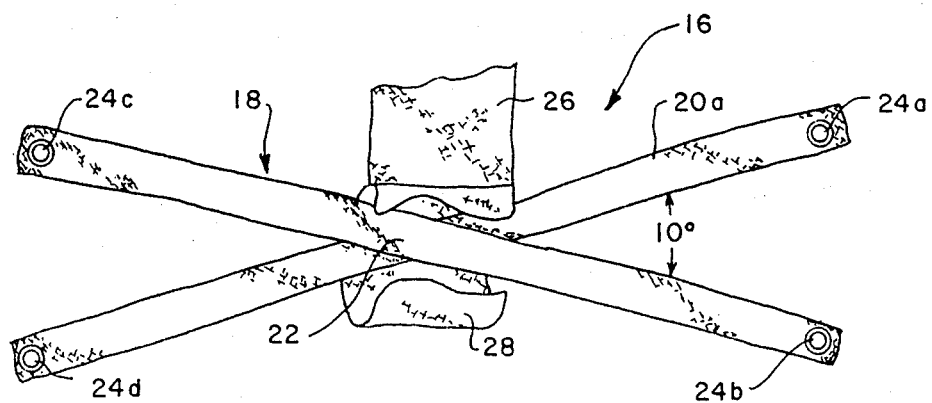
FIG. 3 is the head restraint of FIG. 1 laid out in a plan view with the loop cut away to show the strap assembly.

FIG. 3 shows a preferred embodiment of strap assembly 18 laid out in an extended configuration. It may be composed of two strips 20a and 20b of a material such as nylon webbing attached as by stitching to each other at approximately their midpoints in a criss-cross fashion to form vertical angles of approximately 0°. Where they overlap and attach forms a central section 22, from which the four legs of the angles formed by strips 20a and 20b extend. Strips 20a and 20b should be of such a length that when central section 22 is located behind the head of aircrewman 10 at a height corresponding approximately to the horizontal plane through the center of gravity of the head, their four ends can be connected to helmet 14 at two points adjacent to each ear without slack in either strip 20a or 20b.

Connecting means, such as snap sockets 24a, b, c, and d, are fixed near the ends of strips 20a and 20b for connecting to corresponding snap balls (not shown) located on helmet 14. As shown in FIG. 2, snap sockets 24a and 24b connect to their respective snap balls at points adjacent to one ear, one (24a) above it and the other (24b) below it, straddling and approximately equidistant from, the horizontal plane through the head's center of gravity. Snap sockets 24c and 24d are similarly connected at points adjacent to the other ear (not shown). Other releasable connecting means positioned at the same location with respect to the ears could be used as well.

A retaining strap 26 having two ends is slidably connected as by a loop 28 at one end thereof to strap assembly 18 and is releasably fixed at the other end thereof to a retracting means 30, which is fixed to seat 12. Retaining strap 26 may be composed of any suitable material such as nylon webbing. Loop 28 surrounds strap assembly 18 in the vicinity of central section 22, which is slidable therethrough. To facilitate the sliding the nylon webbing used to form strap assembly 18 may be made to become narrow or rolled at and around central point 22.

Retracting means 30 may be any means which applies a force (arrow F) to retaining strap 26 when the head is being forced forward. One such arrangement is an inertia reel 32 fixed to seat 12 approximately behind the center of the head, with a pay-out cable 34 reeling off the inertia reel and releasably connecting to retaining strap 26. Alternatively, inertia reel 32 may be fixed lower down and behind seat 12, in which case a pulley pin (not shown) would be fixed in the seat behind the head, over which cable 34 would route in order to redirect the retracting force F directly back from the head. This latter arrangement may be desirable when inertia reel 32 is being used simultaneously with a torso restraint. Inertia reels are conventional in the art, as shown in U.S. Pat. No. 4,667,902 to Zenobi.

FIGS. 1 and 2 best illustrate head restraint 16 in use. Aircrewman 10 is wearing helmet 14 and is positioned in seat 12 with head restraint 16 in place. Under normal flight circumstances, when deceleration forces to the head are below a predetermined level, inertia reel 32 permits cable 34 to pay out and retract as the aircrewman's head movement demands. Aircrewman 10 is able to move his head from side to side as strap assembly 18 slides through loop 28. During high G-load maneuvers when the deceleration forces are above a predetermined level, inertia reel 32 causes cable 34 to retract, and the reel locks in place. Retaining strap 26 applies a single force F to the head by pulling it directly back from its center of gravity, while the two points of connection of strap assembly 18 on each side of helmet 14 hold the head upright. Inertia reel 32 may be set, as known in the art, to lock and retract cable 34 at any desired force magnitude, which is determined based on the aircrewman's ability to hold his head upright on his own. Of course, if inertia reel 32 is also connected to a torso restraint, it is adapted to simultaneously retract the torso and head. Inertia reel 32 may be adjusted to retract to a position that corresponds to the head and body leaning slightly forward if desired. Alternatively, retaining strap 26 may be adjusted in length to alter the angle of the head with respect to the body, if desired.

Some of the many features and advantages of the invention should now be readily apparent. For instance, apparatus has been provided for restraining the head of an aircrewman during high G-load maneuvers of the aircraft, allowing him to continue to operate the controls and see out of the aircraft. The system does not interfere with the operation of the aircraft during normal flight conditions. Furthermore, the head restraint provided by the present invention is simple and economical to fabricate and use.

Having thus described the invention, it will be apparent to those skilled in the art that various modifications can be made within the spirit and scope of the present invention. For instance, strap assembly 18 may comprise any strap arrangement which connects to helmet 14 at the above-described locations and forms the equivalent of central section 22 for sliding through loop 28. Also, any means for applying a force F to retaining strap 26 to pull the head back against deceleration forces may be used. Accordingly, the invention is intended to encompass all such modifications.

What is claimed is:

1. A head restraint for a vehicle seat occupant wearing a helmet, for arresting the forward and downward movement of the occupant's head when the occupant is subjected to deceleration forces greater than a predetermined level, while permitting free side-to-side movement of the head when the forces are at or less than the predetermined level, comprising: a strap assembly releasably connected to the helmet above and below each ear and encircling the back of the head; a retaining strap positioned behind the head and having a loop at one end thereof through which said strap assembly can slide; and a retracting means rigidly attached to the seat substantially behind the occupant's head and releasably connected to said retaining strap, said retracting means pulling back said retaining strap only when the deceleration forces are greater than the predetermined level.

2. The head restraint of claim 1 wherein said strap assembly comprises two flexible strips fixed to each other at essentially their midpoints in a criss-cross fashion to form approximately ten degree vertical angles.

3. The head restraint of claim 1 wherein said strap assembly is releasably connected to the helmet by snap sockets and snap balls.

* * * * *